No. 769,111. PATENTED AUG. 30, 1904.
G. W. PIERCE.
LEVER LOCKING DEVICE FOR ELECTRIC STARTING BOXES.
APPLICATION FILED MAR. 23, 1903.
MODEL.

Witnesses
A. G. Hague
K. K. Keffer

Inventor G. W. Pierce
By Orwig & Lane Att'ys

No. 769,111. Patented August 30, 1904.

UNITED STATES PATENT OFFICE.

GEORGE W. PIERCE, OF BUTTE, MONTANA.

LEVER-LOCKING DEVICE FOR ELECTRIC STARTING-BOXES.

SPECIFICATION forming part of Letters Patent No. 769,111, dated August 30, 1904.

Application filed March 23, 1903. Serial No. 149,041. (Model.)

*To all whom it may concern:*

Be it known that I, GEORGE W. PIERCE, a citizen of the United States, residing at Butte, in the county of Silverbow, in the State of Montana, have invented a new and useful Lever-Locking Device for Electric Starting-Boxes, of which the following is a specification.

In starting electric motors of various classes it is usually essential that the current be first passed through a resistance, and after the motor is started the current is usually applied direct to the motor.

The object of my invention is to provide a simple, durable, and inexpensive lever-locking device by which the starting-lever may be placed in a neutral position and be positively locked against movement from its neutral position to the position required in applying a current direct to the motor, so that the only direction in which the lever may move is toward a position where the lever will throw the current to a resistance, and then after the lever has been moved in the direction required for throwing in a resistance it may then be turned to position as required for applying a direct current to the motor. In this connection it is to be remembered that when a current is thrown direct to a motor while the motor is inoperative the motor is frequently burned out and rendered useless, and the only way this can be avoided is by first running the current through a resistance and then after the motor is started applying the current direct to the motor. Hence my object is to prevent such accidents to a motor by making it impossible to apply the current direct until after the current has been passed through a resistance.

My invention consists in certain details in construction, arrangement, and combination of the various parts of the device whereby the objects contemplated are attained as hereinafter more fully set forth, pointed out in my claims, and illustrated in the accompanying drawings, in which—

Figure 1:
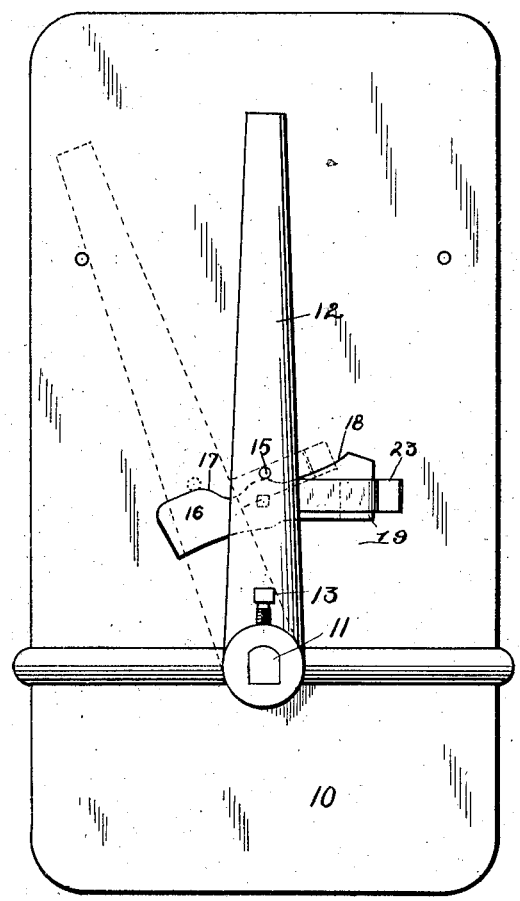
Figure 2:
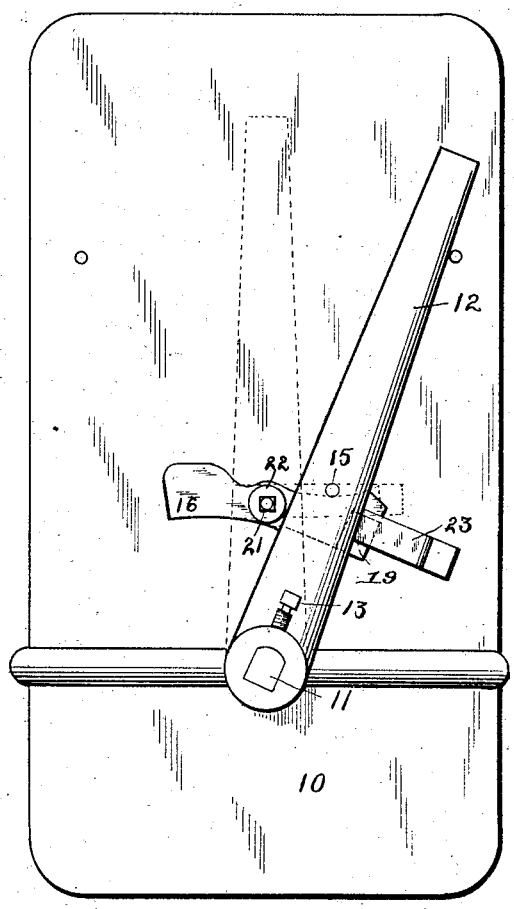
Figure 3:
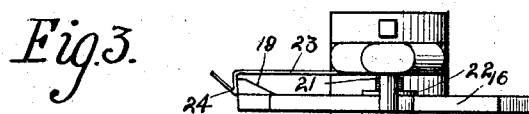
Figure 4:

Figure 1 shows an elevation of a starting-box and starting-lever applied thereto, the lever being shown in its neutral position and by dotted lines shown in a position required for applying a direct current to a motor. Fig. 2 shows a similar view in which the starting-lever is shown in position required for passing the current through a resistance and by dotted lines showing same in its neutral position. Fig. 3 shows a top view illustrating the starting-lever in its neutral position and showing the means by which it is locked. Fig. 4 shows a detail perspective view of the locking-block.

Referring to the accompanying drawings, I have used the reference-numeral 10 to indicate a starting-box of the kind now in common use in various electrical appliances—such, for instance, as two-throw switches, compensators, starting-boxes, controllers, auto-starters, diverters, and the like. Mounted in this box is a shaft 11, which when in one position is arranged to direct a current to a resistance and which when at its other limit of movement directs a current to a motor and when in position between these two points cuts off the current—that is to say, is neutral. The means connected with this shaft 11 for accomplishing the desired result is quite common and well understood, hence is not herein illustrated or described, as it forms no part of my present invention. Fixed to the shaft 11 is a lever 12, held in position on the shaft by means of a set-screw 13. Connected with said lever is a pin 15, projecting toward the starting-box. Mounted on the starting-box is a pivoted locking-block 16. This locking-block is provided on its upper edge with a cam-face 17 on one side of its center and another cam-face, 18, on the opposite side of its center. The end portion of the locking-block beneath the cam-face 18 is provided with an inclined portion 19, projecting from the center of the block in a direction away from the starting-box and toward the end of the locking-block, as clearly shown in Fig. 3. This portion 19, however, is placed only at the lower portion of the block, and above the part 19 the outer surface of the locking-block is smooth and flat for the purposes hereinafter made clear. I have connected this locking-block with the starting-box, as follows: The numeral 20 indicates a raised rim on the starting-box, and 21 indicates a bolt passed through a washer 22 on top of the locking-block, then through the locking-block and seated in the starting-box. By this means the locking-block is permitted a pivotal movement, and yet the said bolt 21 is screwed tight enough to securely hold the locking-block in any position in which it is placed.

The reference-numeral 23 indicates a locking-spring, one end being fixed to the lever 12 and the other end provided with a shoulder 24, said shoulder being designed to engage the part 19, as shown in Fig. 3.

In practical use and assuming the lever 12 to be in a position shown in Fig. 1 and assuming, further, that when said lever is moved to its limit toward the right it will operate to throw a current into a resistance and when moved to its limit on the left will operate to throw a current direct to a motor, when the lever is in the position shown in Fig. 1 it is positively locked against movement to the left by means of the spring 23, with its hook 24 engaging the part 19 of the locking-block. Hence the only direction in which the lever may move is toward the right, and in this position, which is shown in Fig. 2, the pin 15 engages the cam-face 18 and tilts the locking-block 16 to a position shown in Fig. 2. After the lever has been placed at its limit toward the right the locking-block is tilted so that when the lever is returned—that is to say, moved toward the left—the hook 24 will pass above the part 19 of the locking-block 18, as clearly indicated by dotted lines in Fig. 2. Hence there is no obstruction for preventing the lever from being thrown to its limit of movement toward the left, and the current may be then thrown direct to the motor. However, when the lever 12 is moved to its extreme toward the left the pin 15 will engage the cam-face 17, thus returning the locking-block to the position shown by solid lines in Fig. 1. Then when the lever is moved to its neutral position the shoulder 24 will engage the part 19, and the spring 23 will move upwardly, permitting the shoulder 24 to pass beyond the part 19.

Obviously when the lever is at its extreme movement to the left it cannot be thrown to a neutral or inoperative position without causing the locking-spring to engage the locking-block in such a manner as to prevent the lever from returning to its extreme movement to the left, so that after the current is once thrown off from a motor it cannot again be thrown into a motor without first moving the lever to the right and passing the current through a resistance, so that with my improved locking-lever it is impossible to burn out a motor on account of applying a current direct to the motor without first passing it through a resistance.

Having thus described my invention, what I claim, and desire to secure by Letters Patent of the United States therefor, is—

1. The combination of a lever and a lever-locking device, said lever-locking device in one position positively locking the lever against movement in one direction and permitting a free movement thereof in the other direction, said lever-locking device automatically moved by a movement of the lever, in the direction in which the lever is free to move, to its second position and in said second position permitting the lever to move freely in the direction against which it was locked by the lever-locking device in its first position.

2. In a device of the class described, a pivoted lever, a lever-locking device in one position positively locking the lever against movement in one direction only, and in its other position permitting a free movement of the lever in both directions, and means automatically actuated by the lever for moving the lever-lock to its different positions.

3. In a device of the class described, a pivoted lever, a pivoted lever-lock supported adjacent to the lever, in one position locking the lever against movement in one direction only, and in its other position permitting free movement of the lever, and cam-faces on the lock to be engaged by the lever, for moving the lock to its opposite limit, by a movement of the lever.

4. In a device of the class described, a pivoted lever, a spring-hook carried by the lever, a pin on the lever, and a locking-block pivoted adjacent to the lever having an inclined shoulder to be engaged by the spring-hook, and having cam-faces to be engaged by the pin.

5. In a device of the class described, a combination of a lever, a spring-hook carried by the lever, a pin carried by the lever, a pivoted locking-block mounted adjacent to the lever, said spring-hook engaging the locking-lever when the locking-lever is in the center of its path of movement to prevent the lever from moving in one direction, and said pin throwing the locking-block to position out of the path of the spring-hook when the lever is moved in the opposite direction so that the lever may be returned to its central position without the spring-hook engaging the locking-block, and said pin also operating to throw the locking-block into position for locking when the lever is moved from its central position, against which movement it was formerly locked by the said spring.

6. In a device of the class described, a combination of a lever 12, a pin 15 carried by the lever, a spring 23 having a shoulder 24 fixed to the lever, and a pivoted locking-block mounted adjacent to the lever and having the cam-faces 17 and 18 and the inclined shoulder 19, all arranged and combined substantially in the manner set forth and for the purposes stated.

GEORGE W. PIERCE.

Witnesses:
I. MATTINGLY,
JOHN A. SMITH.